United States Patent
Osterkil et al.

(10) Patent No.: US 6,845,782 B2
(45) Date of Patent: Jan. 25, 2005

(54) MULTIPLE TANK CIRCULATING FUEL SYSTEM

(75) Inventors: Alan D. Osterkil, Fort Wayne, IN (US); John W. Stuart, Chicago, IL (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 203 days.

(21) Appl. No.: 10/269,465

(22) Filed: Oct. 11, 2002

(65) Prior Publication Data

US 2004/0069344 A1 Apr. 15, 2004

(51) Int. Cl.⁷ .................................................. F17D 1/00
(52) U.S. Cl. ........................... 137/1; 137/255; 137/391; 137/398; 137/409; 137/899
(58) Field of Search ............................... 137/1, 899, 255, 137/386, 391, 395, 398, 409, 448

(56) References Cited

U.S. PATENT DOCUMENTS

| | | | |
|---|---|---|---|
| 3,981,321 A | 9/1976 | Risse et al. | |
| 4,288,086 A | 9/1981 | Oban et al. | |
| 4,838,307 A | 6/1989 | Sasaki et al. | |
| 4,930,537 A | 6/1990 | Farmer | |
| 5,168,891 A | 12/1992 | Green et al. | |
| 5,287,841 A | 2/1994 | Forsythe et al. | |
| 5,555,873 A | 9/1996 | Nolen | |
| 5,873,348 A | 2/1999 | Fuchs et al. | |
| 6,283,142 B1 | 9/2001 | Wheeler et al. | |
| 6,371,153 B1 | 4/2002 | Fischerkeller et al. | |
| D458,354 S | 6/2002 | Watson | |
| 6,405,744 B1 | 6/2002 | LaPant | |
| 2004/0020474 A1 * | 2/2004 | Pratt et al. | 123/514 |

FOREIGN PATENT DOCUMENTS

| | | |
|---|---|---|
| EP | 0 228 176 B1 | 11/1990 |
| EP | 1 122 423 A2 | 8/2001 |

* cited by examiner

*Primary Examiner*—Kevin Lee
(74) *Attorney, Agent, or Firm*—Jeffrey P. Calfa; Dennis Kelly Sullivan; Susan L. Lukasik (57) ABSTRACT

An apparatus and method for the balancing of fuel among tanks in a circulating fuel system. The tanks in the system have both a draw conduit and a return conduit mounted to and extending into the tank. Flow restriction devices are mounted in both the draw and the return conduits and are controlled by a fuel level detection system, which detects the fuel in the tank.

19 Claims, 6 Drawing Sheets

MULTIPLE TANK CIRCULATING FUEL SYSTEM

BACKGROUND OF INVENTION

The present invention relates to the balancing of fuel among tanks in a circulating fuel system mounted on a vehicle or other fuel consuming systems with multiple tanks. More specifically flow restriction devices on the fuel flow out of and into each tank are used to balance stored fuel among a number of tanks. The level of fuel in a tank controls the flow restriction devices.

PRIOR ART

Circulating fuel supply systems that include multiple fuel tanks are known and are typically used with vehicles. When applied to a vehicle the typical circulating fuel system includes at least two fuel tanks, a fuel pump, and an engine with a fuel supply rail. In operation, the fuel pump draws fuel from the tanks, and pumps the fuel to the fuel supply rail of the engine. The engine consumes some of the fuel. Unconsumed fuel leaves the engine and is returned to the fuel tanks. Thus, fuel is in constant circulation out of and back into the fuel tanks.

As typically used with vehicles the tanks of a circulating fuel system are initially full of fuel. As the vehicle operates, fuel is drawn from the tanks. An engine consumes some of the fuel and any unconsumed fuel is returned to the tanks. Overall stored fuel decreases; however, if the fuel draw and return are not equal for each tank, then the quantity of fuel in the tanks will vary over time. Geometric or mechanical layout differences in tank, draw conduit, and return conduit, or changes in grade during vehicle operation make equal fuel draw and return practically unrealistic. Premature depletion of fuel in a tank relative to other tanks typically results in fuel starvation and engine operational problems.

Unequal fuel draw and return results in the problem of one tank emptying before the others. This unequal depletion of fuel in the various tanks leads to erratic engine operation or fuel starvation. Various solutions have been proposed to balance the fuel in the tanks and to avoid the problems associated by unequal depletion of fuel from the multiple tanks. The known solutions in the prior art include the use of equal tank and conduit geometry, the use of one or more crossover lines, a venturi device, multiple pumps, special flow dividers, shuttle valves, a priming fuel line, or a complicated computer control system which requires an on-board computer and a electrical system for operation. The applications of these various solutions are described in a number of patents.

The present invention balances the fuel in multiple fuel tanks through the use of flow restriction devices in both the draw and return conduits in each tank. As compared with prior inventions, the present invention eliminates the need for similar geometry of the tanks and conduits and their physical layout, crossover lines, more than one fuel pump, a venturi device, special flow dividers, shuttle valves, a priming fuel line, a computer, or an electrical system as needed to operate the computer.

SUMMARY OF INVENTION

An object of the present invention is to provide an apparatus and a method for the balancing of fuel between the various tanks in a multiple tank circulating fuel system. The present invention as applied to vehicles is a circulating fuel system, which includes at least two tanks, a pump which draws fuel from the tank, and an engine which receives fuel from the pump and consumes part of the fuel. Unconsumed fuel is returned to the tanks. The invention satisfies the objective by having a fuel level detection system, a draw conduit restriction device, and a return restriction device for each tank.

In the method of the present invention, the level of fuel in each tank is balanced by detecting the level of fuel in the tank, and then restricting the flow of fuel out of the tank through the draw conduit and restricting the flow of fuel into the tank through the return conduit based on the detected fuel level.

DETAILED DESCRIPTION OF THE INVENTION

Figure 1:
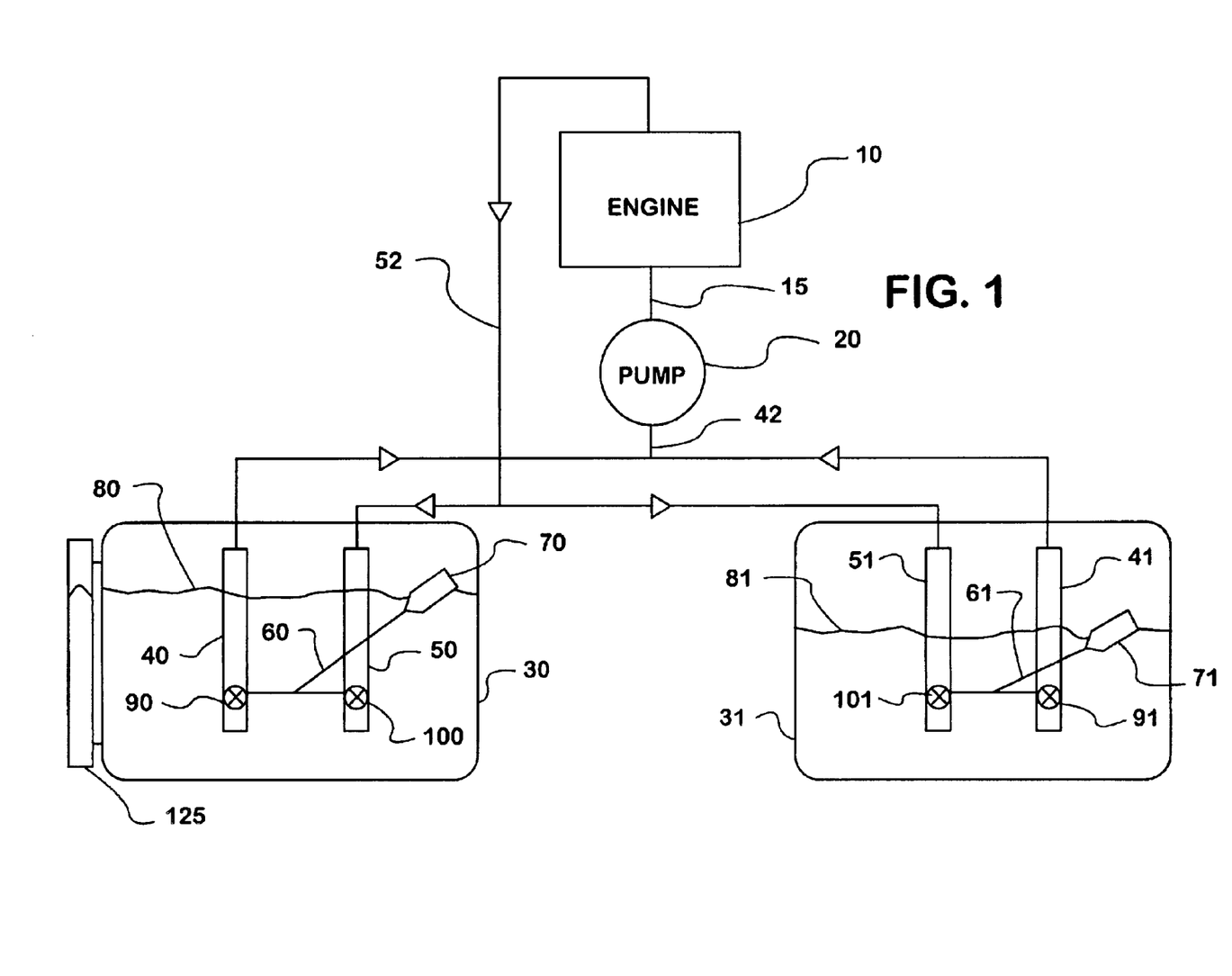
FIG. 1 illustrates a circulating fuel system with flow restriction devices in both the draw and return conduits.

The present invention uses flow restriction devices attached to both the draw and the return conduits of individual fuel tanks to balance the quantity of fuel in the fuel tanks of a circulating fuel system. The explanation of this invention begins with a description of the circulating fuel system with multiple fuel tanks. As shown in FIG. 1, a typical circulating fuel system includes a first tank 30 and a second tank 31. The first and second tanks 30 and 31 contain draw conduits 40 and 41, respectively. The draw conduits 40 and 41 combine into an inlet 42 of the fuel pump 20. The fuel pump discharge 15 connects the fuel pump 20 to the engine 10. In a typical engine the fuel flows through a fuel rail (not shown). A fuel conduit 52 connected to the engine 10 splits into return conduits 50 and 51 which in turn are connected to tanks 30 and 31, respectively.

The draw conduit 40 in the first tank 30 contains a draw restriction device 90. Similarly, the return conduit 50 in the first tank 30 contains a return restriction device 100. Restriction devices, 90 and 100, connect to a float 70 through a float arm mechanism 60. Similarly, the draw conduit 41 and the return conduit 51 in the second tank 31 contain corresponding restriction devices 91 and 101. These flow restriction devices are connected to a float 71 through a float arm mechanism 61.

In operation, fuel in tanks 30 and 31 is drawn into the draw conduits 50 and 51, respectively. The fuel flows past the draw restriction devices, 90 and 91, which control the relative, flow of fuel out of fuel tanks 30 and 31, respectively. The draw restriction devices 90 and 91 are controlled based on fuel levels 80 and 81 through respective float arm mechanisms 60 and 61 and floats 70 and 71. At a low fuel level in either tank 30 or 31 the draw restriction devices 90 or 91, which are respectively controlled through float arm mechanisms 60 and 61, restrict the flow of fuel from the corresponding fuel tank 30 or 31. The restriction of fuel flow from tanks 30 and 31 decreases as the fuel level in the tank increases.

Once past the draw restriction devices 90 and 91, the fuel flows out of the draw conduits 50 and 51 and combines in the fuel pump inlet 42. The combined fuel is drawn into the fuel pump 20, which provides the suction to draw the fuel from the fuel tanks 30 and 31. From the fuel pump 20 the fuel flows under pressure to the engine 10 via the fuel pump discharge 15. In a typical vehicle engine the fuel flows through a fuel rail in the engine from which some of the fuel is consumed by the engine 10. Fuel that is not consumed exits the engine 10, and flows into a fuel return conduit 52. From the fuel return conduit 52, the return fuel splits between the return conduits 50 and 51.

The return fuel in return conduits 50 and 51 flows past the return restriction devices 100 and 101 which control the relative flow of return fuel into fuel tanks 30 and 31, respectively. The return restriction devices 100 and 101 are controlled based on fuel levels 80 and 81 through the respective float arm mechanisms 60 and 61 and floats 70 and 71. At a high fuel level in a tank, the return restriction devices 100 or 101, which are respectively controlled through float arm mechanisms 60 and 61, restrict the flow of return fuel into the corresponding fuel tanks 30 or 31. The restriction of return fuel flow into tanks 30 and 31 decreases as the fuel level in the tank decreases.

The restriction devices 90, 91, 100, and 101 operate to balance fuel among tanks 30 and 31 by providing a varying degrees of restriction to fuel flow from and into tanks 30 and 31 based on the relative fuel levels 80 and 81. For example, if the fuel level in tank 30 is greater than the fuel in tank 31, then the draw restriction device 90 will be open to a greater degree than the draw restriction device 91. This allows fuel to be preferentially drawn from tank 30 as opposed to tank 31. Similarly, if the fuel level in tank 30 is greater than the fuel level in tank 31, then the return restriction device 100 will close to a greater degree than the return restriction device 101. Thus, fuel preferentially returns to tank 31 as opposed to tank 30. With more fuel being drawn from and less fuel being returned to tank 30 relative to tank 31, the fuel quantities in tanks 30 and 31 eventually become equal and the tanks are considered balanced.

Figure 2:
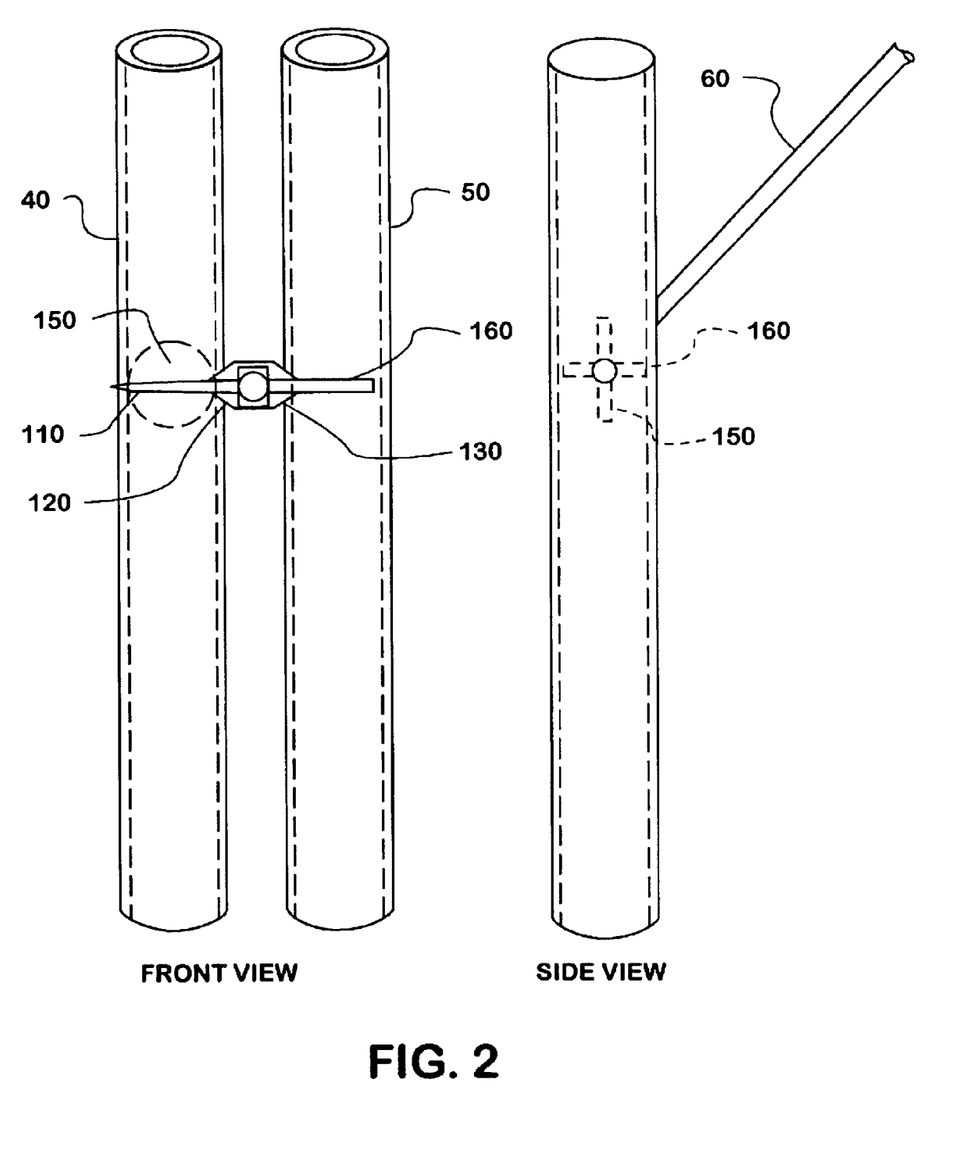
FIG. 2 illustrates a float and a float arm mechanism for the control of both the draw and return flow restriction devices.

In an embodiment of the invention as shown in FIG. 2, the flow restriction devices are butterfly valve 150, which is mounted inside draw conduit 40, and butterfly valve 160, which is mounted inside return conduit 50. The butterfly valves 150 and 160 are supported on opposite ends of a shaft 110. The shaft 110 is moveable mounted through both a draw conduit hole 120 in the draw conduit 40 and a return conduit hole 130 in the return conduit 50. The butterfly valves 150 and 160 are supported perpendicular to each other when viewed form either end of the shaft 110. The float arm mechanism 60 is attached to the support shaft 110, and is designed to move the support shaft 110 through a 90-degree rotation from the full tank position to the empty tank position.

In the operation of this embodiment, the draw butterfly valve 150 in the draw conduit 40 is fully open and the return butterfly valve 160 in the return conduit 50 is fully closed when the fuel level in the tank is high. Conversely, the draw butterfly valve 150 in the draw conduit 40 is fully closed and the return butterfly valve 160 in the return conduit 50 is fully open when the fuel level in the tank is low.

Figure 5:
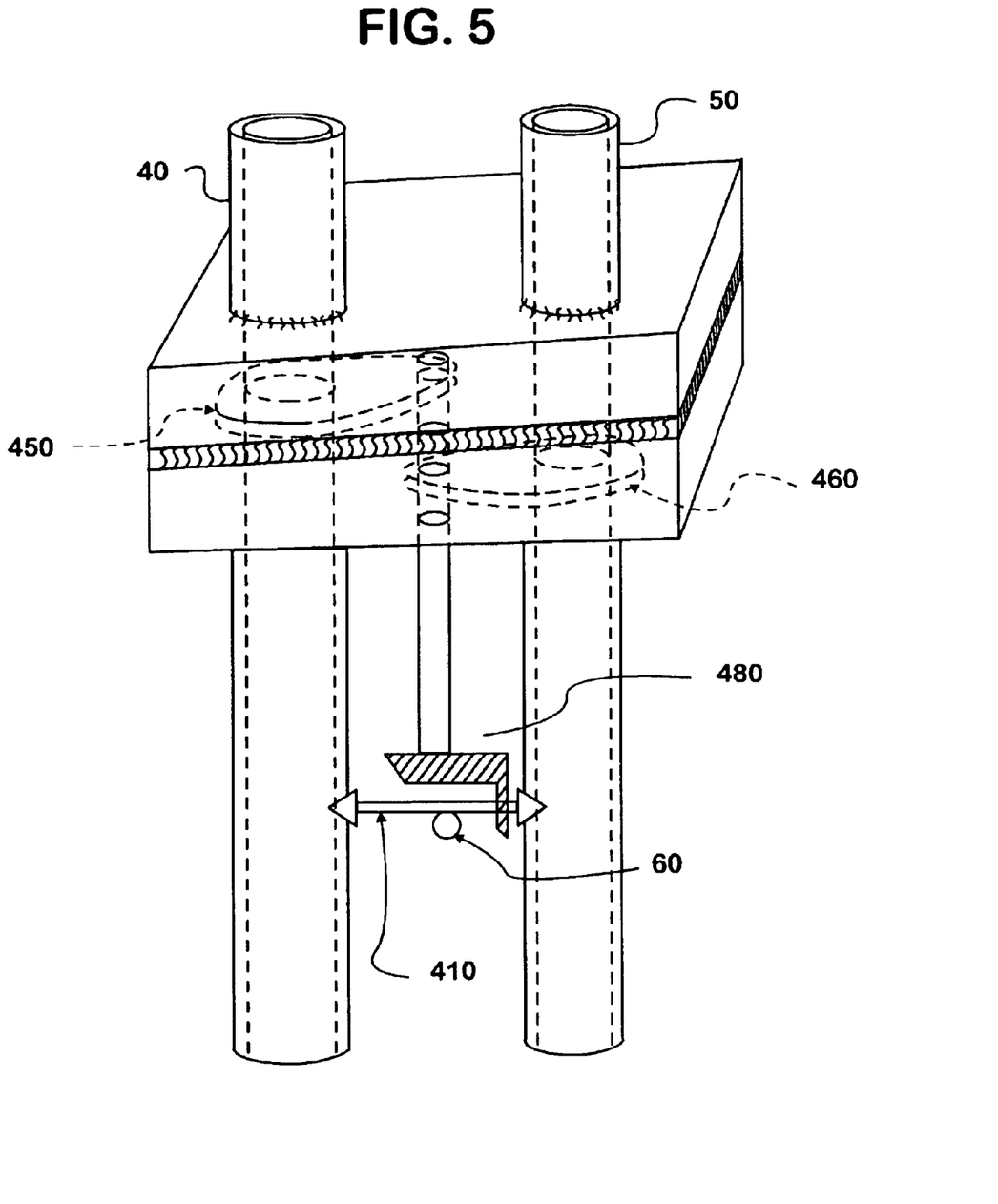
FIG. 5 illustrates a float and a gear mechanism to control gates which restrict both the draw and return fuel flow.

The embodiment shown in FIG. 2 directly connects the float arm mechanism to the flow restriction devices. However, the float arm mechanism may also be indirectly connected to the float restriction devices through a gear mechanism, as shown in FIG. 5. In this variation a gear device 480 indirectly connects the float arm 60 to the restriction devices, draw gate 450 and return gate 460. One skilled in the art would further recognize that restriction devices are not limited to butterfly valves but may be blades, balls, other types of valves or gates, etc. In addition, the restriction devices may be located inside the draw and return conduits or proximately close to the respective open ends of the conduits.

Figure 3:
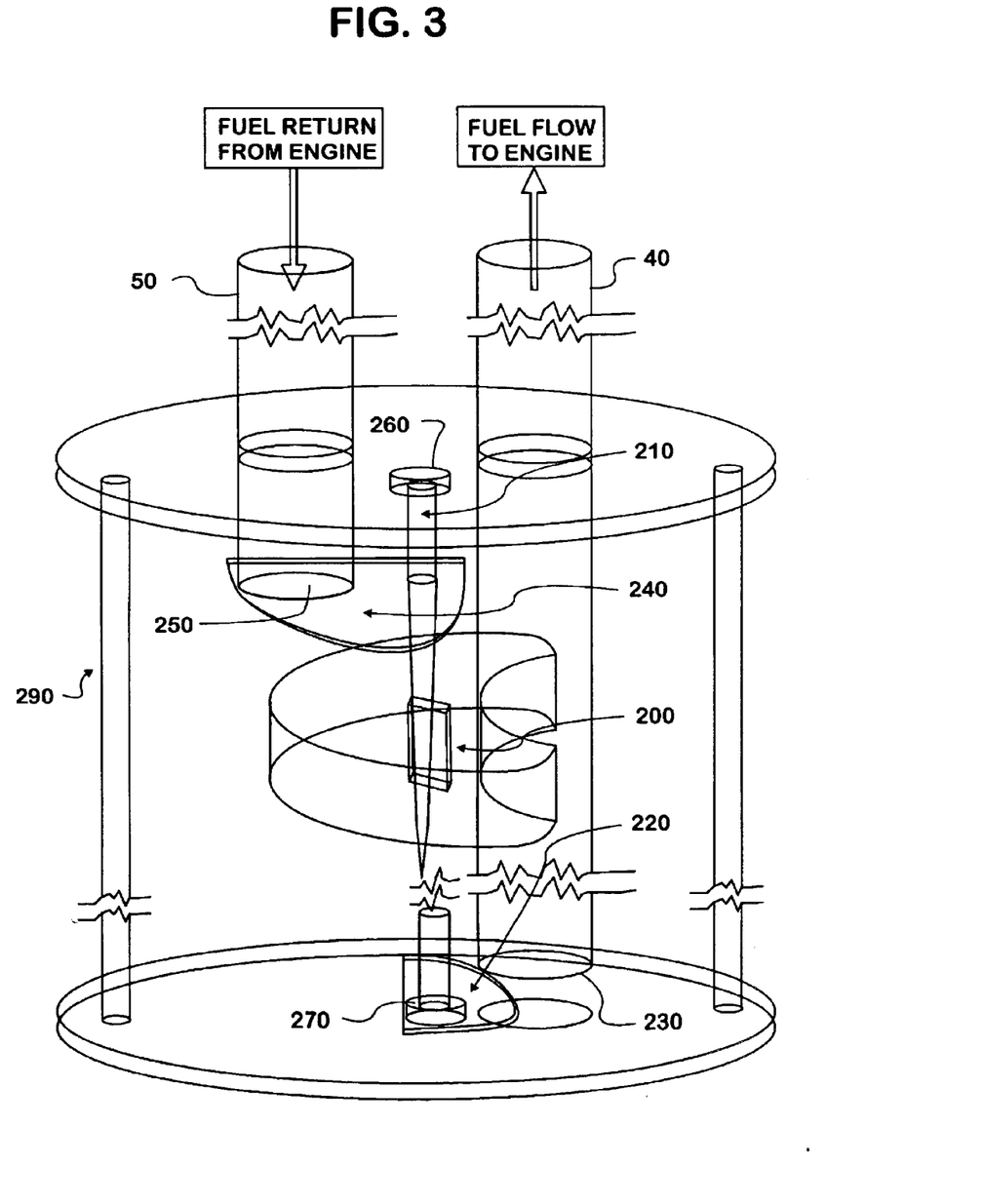
FIG. 3 illustrates a float and a twisted guide mechanism to control gates which restrict both the draw and return fuel flow.

Another embodiment of the present invention as shown in FIG. 3 includes a float 200 slideably mounted to a twisted guide 210 and the draw conduit 40. A first end 260 and a second end 270 of the twisted guide 210 are rotatably mounted to a support structure 290, which is mounted inside the tank (not shown). Alternatively, the first and second ends of the twisted guide 210 may be rotatably mounted to the draw conduit 40, or an inside surface of the tank 30. The draw restriction device is a draw gate 220, which is mounted on the twisted guide 210 and is proximately close to the draw conduit inlet 230. The return restriction device is a return gate 240, which is mounted to the twisted guide 210 and is proximately close to the return conduit outlet 250.

Figure 4:
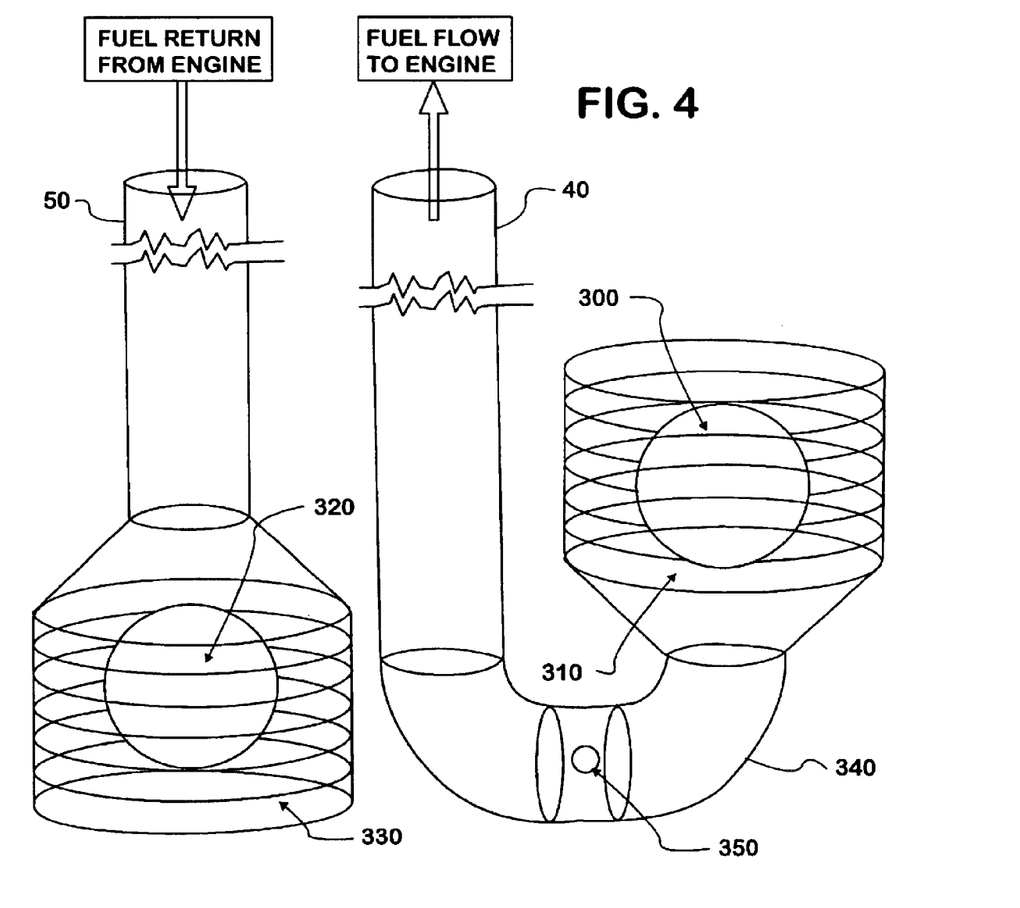
FIG. 4 illustrated the use of a caged floatball device on the draw conduit and a caged floatball device on the return conduit to restrict the fuel draw and fuel return respectively.

For this embodiment the up and down movement of the float 200 in response to fuel level in the tank causes the twisted guide 210 to rotate around its longitudinal axis. The draw conduit 40 acts to prevent rotation of the float 200, thus giving rise to rotation of the twisted guide 210 as the float 200 move up and down. The rotation of the twisted guide 210 results in the movement of draw gate 220 and return gate 240. The draw gate 220 moves to restrict fuel flow into the draw conduit inlet 230 as the fuel level in the tank decreases. Conversely, the return gate 240 moves to restrict fuel flow out of the return conduit outlet 250 as the fuel level increases. Another embodiment of the present invention as shown in FIG. 4 includes a draw floatball 300 contained in a draw cage 310, and a return floatball 320 contained in a return cage 330. The draw cage 310 is attached to an end of a draw conduit extension 340, which is U-shaped and is in close proximity to the bottom of the tank 30. The second end of the draw conduit extension 340 is attached to the draw conduit 40. A weep hole 350 in the draw conduit extension is optional. The return cage 330 is attached to the outlet of the return conduit 50.

In this embodiment, the return floatball 320 restricts fuel flow out of the return conduit 50 when the tank fuel level is high. When the level of fuel in the tank is low the draw floatball 300 restricts the flow of fuel out of the tank and into the draw conduit 40. An optional weep hole 350 in the draw conduit extension 340 allows residual fuel in the very bottom of the fuel tank to be drawn into the draw conduit 40.

Figure 6:
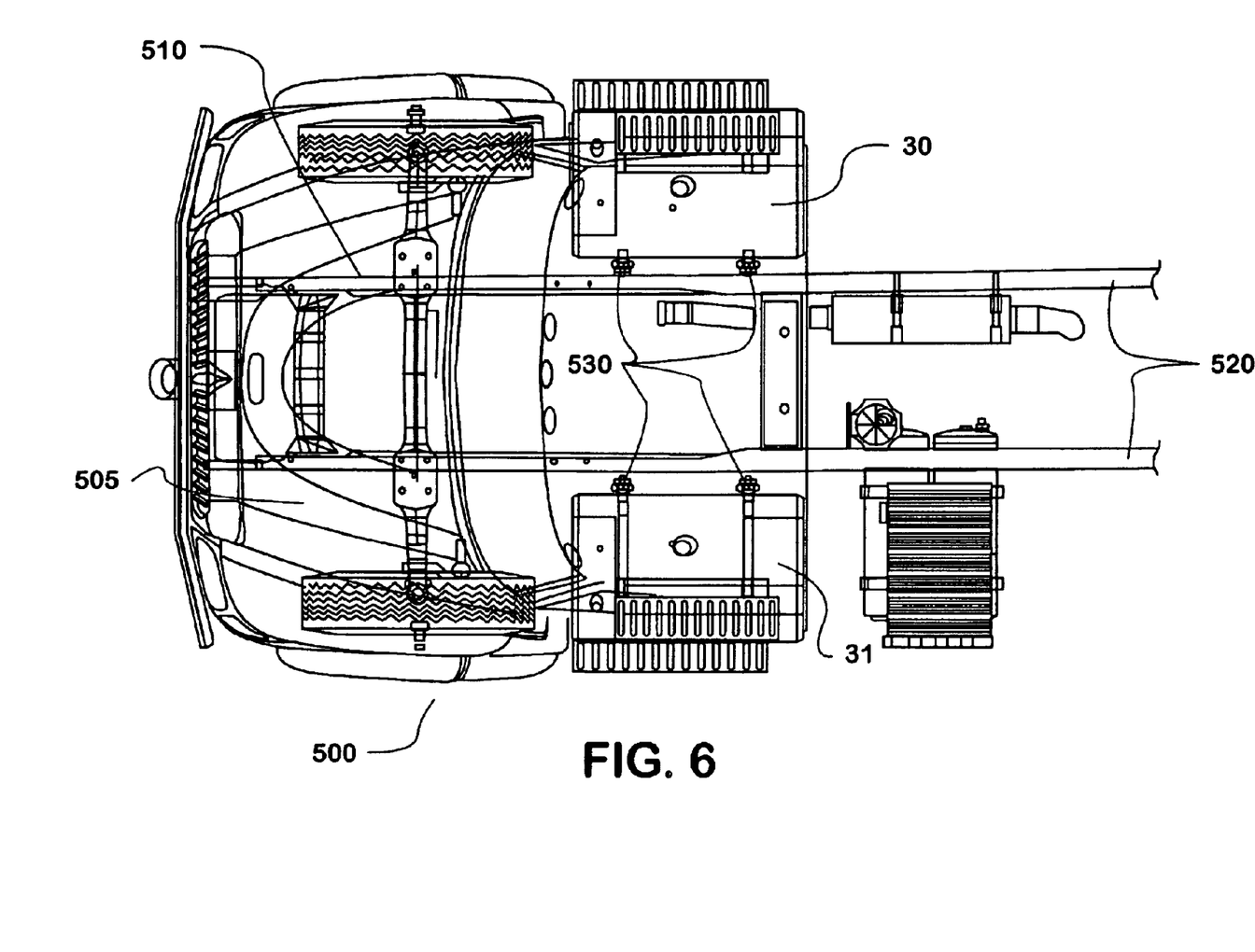
FIG. 6 illustrates a vehicle with dual fuel tanks of a circulating fuel system mounted to the main rail of the chassis.

Another embodiment of this invention is a vehicle 500 with chassis 510 to which is mounted a circulating fuel system with at least two tanks. FIG. 6 specifically shows a truck with two tanks, 30 and 31, mounted to a frame rail 520 of chassis 510 by a number of attachment devices 530. Although not shown the rest of the circulating system, which includes an engine, a pump, a draw conduit, and a return conduit, are mounted to the vehicle chassis 510 or cab 505.

The embodiments disclosed above describe a variety of flow restriction devices which include butterfly valves, gates, and caged floatballs. Flow restriction devices may also include different types of valves such as ball valves, globe valves, check valves, flapper valves, etc. In addition, flow restriction devices may also include a venturi, an orifice, etc. including variations such as a variable venturi, a variable orifice, etc. One skilled in the art would understand that there are many types of flow restriction devices which may be used and the devices are not limited to those in the embodiments or examples given in this disclosure.

In addition, a fuel level sending device may be provided for use in monitoring the fuel level in an individual tank. The fuel level sending device may be a mechanical device as the sight gauge 125 in FIG. 1 for the monitoring of the fuel level in close proximity to the tank, or an electric rheostat (not shown) connected to either a float or float arm for use in displaying the fuel level inside the cab of a vehicle.

The present invention is also a method for detecting a fuel level in a tank and controlling both the draw of fuel out of and the return of fuel into a tank based on the detected fuel level. The method also includes the comparing of fuel levels in at least two tanks and determining a differential level which is used to control the fuel drawn and returned to each fuel tank. While the present invention is shown in several embodiments, it is not limited but susceptible to various changes and modifications without departing from the spirit and scope of the invention.

We claim:

1. An apparatus for balancing fuel in a circulating fuel system having a fuel consumption system comprising:
   at least two tanks;
   a draw conduit mounted to each said tank and having a first end extending into said tank;
   a second end of said draw conduit adaptedly connected to the fuel consumption system;
   a return conduit mounted to each said tank and having a first end extending into each said tank;
   a second end of said return conduit adaptedly connected to the fuel consumption system;
   a draw restriction device attached to said draw conduit;
   a return restriction device attached to said return conduit; and
   a fuel level detection system, which is mountable inside each said tank, for use in detecting a fuel level and using said fuel level to control said draw restriction device and said return restriction device.

2. The apparatus in claim 1 further comprising:
   a fuel level sending device which is mountable to said tank whereby said fuel level in said tank is monitored.

3. The apparatus in claim 1 wherein said fuel level detection system comprises:
   a float;
   a float arm with a first end connected to said float;
   a shaft having a middle portion which is connected to a second end of the float arm;
   a first end of said shaft rotatably attached to said draw conduit;
   a second end of said shaft rotatably attached to said return conduit;
   said draw restriction device mounted to said first end of said shaft; and
   said return restriction device mounted to said second end of said shaft.

4. The apparatus in claim 1 wherein said fuel level detection system comprises:
   a float;
   a float arm with a first end connected to said float; and
   a gear mechanism operably connected to a second end of the float arm, said draw restriction device, and said return restriction device.

5. The apparatus in claim 1 wherein said fuel level detection system comprises:
   a twisted guide rotatably mounted to said tank;
   a float slideably connected to said twisted guide through a guide slot in said float;
   an anti-rotation member slideably connected to said float;
   a first end of the twisted guide operably connected to said draw restriction device; and
   a second end of the twisted guide operably connected to said return restriction device.

6. The apparatus in claim 1 wherein the fuel level detection system comprises:
   a first caged floatball device mounted to said first end of said draw conduit whereby a first floatball in close proximity to said first end of said draw conduit acts as a flow restriction device;
   a U-shaped conduit with a first end connected to said first end of said return conduit; and
   a second caged float device connected to a second end of said U-shaped conduit whereby a second floatball in close proximity to said second end of said U-shaped conduit acts as a flow restriction device.

7. The apparatus in claim 6 wherein:
   said U-shaped conduit is proximately close to a bottom of the tank.

8. The apparatus in claim 7 further comprising:
   a weep hole in said U-shape conduit wherein said weep hole is proximately close to a bottom of said tank.

9. The apparatus in claim 1 wherein:
   said draw restriction device is a valve.

10. The apparatus in claim 1 wherein:
    said return restriction device is a valve.

11. An engine system having a circulating fuel supply system which balances fuel among multiple fuel storage containers comprising:
    at least two tanks;
    a draw conduit mounted to each said tank, and having a first end extending into said tank;
    a pump adaptedly connected to a second end of said draw conduit;
    a fuel consuming engine connected to said pump;
    a return conduit mounted to each said tank and having a first end extending into each tank;
    a second end of said return conduit adaptedly connected to said fuel consuming engine;
    a shaft having a first end rotatably mounted to said draw conduit and extendable into said draw conduit;
    a second end of said shaft rotatably mounted to said return conduit and extendable into said return conduit;
    a float arm with a first end connected to said shaft;
    a float connected to a second end of said float arm;
    a draw butterfly valve mounted to said first end of said shaft; and
    a return butterfly valve mounted to said second end of said shaft.

12. The apparatus in claim 11 further comprising:
    a fuel level sending device which is mountable to said tank whereby a fuel level in said tank is monitored.

13. The apparatus in claim 11 wherein:

said draw butterfly valve is mounted on said shaft at a 90-degree angle relative to said return butterfly value when viewed from either end of said shaft; and said float arm that is moveable through a 90 degree angle from a high fuel level position to a low fuel level position.

14. A vehicle comprising:

a chassis;

an fuel consuming engine mounted to said chassis;

a fuel pump mounted to said chassis and connected to said fuel consuming engine;

at least two tanks mounted to said chassis;

a draw conduit mounted to each said tank;

a first end of said draw conduit extending into each said tank;

a second end of said draw conduit connected to said fuel pump;

a return conduit mounted to each said tank;

a first end of said return conduit extending into each said tank;

a second end of said return conduit connected to said fuel rail of said engine;

a draw restriction device attached to said draw conduit;

a return restriction device attached to said return conduit; and a fuel level detection system mounted inside each said tank for detection of a fuel level for use in the control of both said draw restriction device and said return restriction device.

15. The apparatus in claim 14 further comprising:

a fuel level sending device which is mountable to said tank whereby said fuel level in said tank is monitored.

16. The apparatus in claim 14 wherein:

said draw restriction device is a valve.

17. The apparatus in claim 14 wherein:

said return restriction device is a valve.

18. A method for balancing the fuel in a circulating fuel system with at least two tanks comprising:

drawing fuel from the at least two tanks to a fuel consumption system;

returning fuel to the at least two tunics from said fuel consumption system;

detecting a fuel level in each of the at least two tanks;

restricting a flow of fuel returned to each of the at least two tanks based on said fuel level; and restricting a flow of fuel drawn from each of the at least two tanks based on paid fuel level.

19. The method in claim 18 further comprising:

comparing said fuel levels in at least two tanks whereby a differential fuel level is determined;

restricting a flow of fuel returned to each of the at least two tanks based on said differential fuel level; and restricting a flow of fuel drawn from each of the at least two tanks based on said differential fuel level.

* * * * *